United States Patent
Clarke

(10) Patent No.: US 7,600,734 B2
(45) Date of Patent: Oct. 13, 2009

(54) LOCKING ASSEMBLY FOR STANCHION

(75) Inventor: Dougan Clarke, Miami, FL (US)

(73) Assignee: TUUCI Engineering and Design, Inc., Miami, FL (US)

( * ) Notice: Subject to any disclaimer, the term of this patent is extended or adjusted under 35 U.S.C. 154(b) by 0 days.

(21) Appl. No.: 11/703,532

(22) Filed: Feb. 7, 2007

(65) Prior Publication Data

US 2007/0237574 A1 Oct. 11, 2007

Related U.S. Application Data

(60) Provisional application No. 60/765,839, filed on Feb. 7, 2006.

(51) Int. Cl.
*F16M 13/00* (2006.01)

(52) U.S. Cl. .................. 248/519; 135/20.3; 135/120.3; 248/539; 403/330

(58) Field of Classification Search .................. 248/551, 248/519, 539, 346.03, 46.04, 500, 507, 910; 403/330; 135/20.3, 120.3, 98, 99
See application file for complete search history.

(56) References Cited

U.S. PATENT DOCUMENTS

| 695,663 | A | | 3/1902 | Weirich |
| 2,230,898 | A | * | 2/1941 | MacFadden ................. 248/500 |
| 2,396,747 | A | | 3/1946 | Parrott |
| 2,628,797 | A | | 2/1953 | Campomar |
| 2,819,725 | A | * | 1/1958 | Deisenroth et al. ......... 135/20.3 |
| 3,156,249 | A | | 11/1964 | Biderman |
| 3,850,186 | A | | 11/1974 | Weber et al. |
| 4,433,699 | A | | 2/1984 | Schultes et al. |
| 4,928,718 | A | | 5/1990 | Apple |
| 5,020,557 | A | | 6/1991 | Apple |
| 5,152,495 | A | | 10/1992 | Jacinto et al. |
| 5,224,505 | A | | 7/1993 | Wu |
| 5,255,954 | A | * | 10/1993 | Rogers ................... 297/184.16 |
| 5,337,989 | A | | 8/1994 | Apple |
| 5,410,937 | A | | 5/1995 | Okamoto et al. |
| 5,441,066 | A | | 8/1995 | Harris |
| 5,525,000 | A | * | 6/1996 | Belobraydich et al. ....... 403/102 |
| 5,535,978 | A | | 7/1996 | Rodriguez et al. |
| 5,571,229 | A | | 11/1996 | Fitzsimmons et al. |
| 5,697,190 | A | | 12/1997 | Scribner |
| 5,711,332 | A | | 1/1998 | Apple |
| 5,752,349 | A | | 5/1998 | Fitzsimmons et al. |

(Continued)

FOREIGN PATENT DOCUMENTS

WO WO2007/092514 A2 8/2007

*Primary Examiner*—Ramon O Ramirez
(74) *Attorney, Agent, or Firm*—Malloy & Malloy, P.A.

(57) ABSTRACT

An locking assembly structured to removably and automatically secure an umbrella mast or other stanchion to a supporting base including a mounting structure secured to the base in interconnecting relation between the stanchion and the base. The locking assembly is connected to the mounting structure and includes a movable locking member positionable between a locked orientation and a released orientation. The locked and released orientations are respectively and at least partially defined by the locking member disposed into and out of interruptive engagement with a predetermined exterior surface portion of the stanchion on an interior of the mounting structure. Automatic disposition of the locking member between the released and locked orientations is facilitated by an end portion of the locking member configured and structured to both slidingly and interruptively engage the stanchion.

34 Claims, 12 Drawing Sheets

U.S. PATENT DOCUMENTS

| | | |
|---|---|---|
| 5,833,349 A | 11/1998 | Apple |
| 5,913,778 A | 6/1999 | Hying et al. |
| 5,918,849 A | 7/1999 | Bliss |
| D420,890 S | 2/2000 | Kuhnke |
| D421,708 S | 3/2000 | Kuhnke |
| 6,041,559 A | 3/2000 | Schickert et al. |
| 6,089,246 A | 7/2000 | Barnes |
| 6,155,937 A | 12/2000 | Alter |
| 6,199,569 B1 * | 3/2001 | Gibson ........................ 135/16 |
| 6,202,369 B1 | 3/2001 | Partee et al. |
| 6,213,672 B1 | 4/2001 | Varga |
| 6,386,214 B1 | 5/2002 | Clarke |
| 6,461,084 B1 | 10/2002 | Stuart |
| 6,682,000 B1 | 1/2004 | Apple |
| 6,691,721 B2 | 2/2004 | Apple |
| 6,767,019 B2 | 7/2004 | van Hekken |
| 6,802,325 B1 | 10/2004 | Apple |
| 6,889,699 B2 | 5/2005 | Clarke |
| 7,040,593 B1 | 5/2006 | Weatherall |
| 7,302,745 B2 * | 12/2007 | Stahle ......................... 29/434 |
| 2001/0054433 A1 * | 12/2001 | Patarra ....................... 135/16 |
| 2003/0168090 A1 | 9/2003 | Apple |
| 2005/0045219 A1 | 3/2005 | Apple |
| 2005/0126612 A1 * | 6/2005 | Chen .......................... 135/16 |

\* cited by examiner

LOCKING ASSEMBLY FOR STANCHION

CLAIM OF PRIORITY

The present application is based on and a claim of priority is made under 35 U.S.C. Section 119(e) to a provisional patent application currently pending in the U.S. Patent and Trademark Office, namely, that having Ser. No. 60/765,839 and a filing date of Feb. 7, 2006.

BACKGROUND OF THE INVENTION

1. Field of the Invention

This invention relates to an assembly structured to removably and automatically secure the mast or center pole of an umbrella, or other stanchion type structure whether or not associated with an umbrella, to a supporting base. At least one locking member is disposed and configured to automatically, movably and interruptively engage predetermined exterior surface portions of the mast or stanchion as it is being mounted on the base. The need for a manual positionable locking device, such as a locking pin, threaded locking knob or like connector is thereby eliminated.

2. Description of the Related Art

The use of large outdoor umbrellas at cafés and in recreational areas has become common-place due, at least in part, to their highly valued esthetic appearance, as well as their ability to provide shade and other protection from ambient weather conditions. Because outdoor umbrellas and like shade structures are relatively large and frequently subjected to strong wind conditions, it is important to provide adequate stability in the form of an anchor or support base. As used herein, the wording "support base" is meant to be descriptive of any of a large number of conventional or customized base structures used to support a variety of different structures such as, but not limited to, large outdoor umbrellas. Accordingly, the weight of conventional support bases of the type described may vary dependent upon the object or device being supported. As such, support bases utilized to anchor outdoor umbrellas, as well as other devices having a center pole, supporting mast or similar stanchion-like structure are made sufficiently heavy to provide adequate stability to the supported object.

In use, the umbrella mast, center pole or stanchion-like structure associated therewith has a lower or distal end dimensioned and configured to be removably received within a sleeve-like mounting assembly. The mounting assembly is fixedly secured to the weighted base using known connection mechanisms or is integrally or otherwise attached thereto. Therefore, cooperative structuring between the lower or distal end of the stanchion of the umbrella and interior of the sleeve-like mounting assembly facilitates removable passage of the distal end into and out of the interior of the mounting sleeve. The need to secure the umbrella stanchion to a weighted supporting base is apparent when considering that the exposure of the umbrella to even light or moderate wind conditions could, in certain instances, cause significant lifting forces to be exerted thereon. More specifically, absent an effective locking assembly, an open umbrella can be subjected to sufficient lifting forces to cause a separation of the umbrella from the base. Clearly, the inadvertent separation of the umbrella from the supporting base has the potential to present hazardous conditions, both to individuals and/or other property within the area, as well as the potential to severely damage the umbrella itself.

Accordingly, in order to prevent such inadvertent separation of the umbrella from the weighted, supporting base, a locking assembly is typically provided. Conventional or known locking assemblies of the type referred to often include an insertable pin which passes through both the exterior of the mounting sleeve and an aligned channel or passage formed in the lower or distal end of the umbrella mast. Other locking assemblies used for this purpose include a threaded locking knob which is threadedly secured to the sleeve portion of the mounting assembly and which is externally accessible for hand manipulation. As such, a threaded locking finger or shaft of the knob is forced against the exterior surface of or through the distal end of the umbrella mast or supporting stanchion.

While known and/or conventional locking assemblies of the type described above are considered to be at least minimally effective for their intended purpose of securing the umbrella to the supporting base, each requires manual manipulation or positioning to accomplish secure interconnection of the umbrella mast or supporting stanchion to the base, in the manner described. Such manual application of the conventional locking assemblies is inconvenient, relatively time consuming and frequently difficult to accomplish by a single individual installing the umbrella on the supporting base. Also, because of the inconvenience associated with such manual manipulation, irresponsible individuals may not properly secure such known locking devices in the required fashion. If not properly secured, the conventional locking assemblies may be inadequately positioned to accomplish the intended locking attachment of the umbrella to the base in a manner which will prevent inadvertent removal of the umbrella.

Therefore, there is a need in the field associated with the manufacture, installation and/or utilization of large umbrellas and other stanchion supported structures for a new and improved locking assembly. Such an improved, proposed locking assembly should preferably be structured to removably and yet securely mount a supporting stanchion to an anchoring support base in a manner which overcomes the known problems and disadvantages associated with conventional locking assemblies, such as those described above. Moreover, if any such improved locking assembly were developed, it would ideally be structured to "automatically" accomplish a locking interconnection, such as between the distal end of a stanchion or like structure and a weighted or other supporting base, without the need for excessive manual manipulation. However, any locking assembly developed to allow for such "automatic" locking interconnection should be secure, while permitting quick and easy removal of the stanchion from the support base with only a minimal amount of manipulation.

Any such improved locking assembly would also preferably be readily adaptable for use with a base having a sleeve-like mounting structure for receiving and holding the distal end of the stanchion. Further, any such improved locking assembly should be readily adaptable for use with like mounting structures associated with weighted, anchored or other bases of various dimensions and configurations and structurally corresponding stanchions supported thereby. Finally, any such improved locking assembly would ideally also be of simple construction, yet sufficiently strong and durable to have a long operative life, even when used and/or stored in an outdoor environment or when exposed to adverse weather conditions.

SUMMARY OF THE INVENTION

This invention is directed to a locking assembly intended primarily for use with large outdoor umbrellas in hopes of presenting a solution to the long felt needs described above. As such, the present invention is structured to automatically secure the mast of an umbrella or other stanchion-like structures to a supporting base or like anchoring assembly, and preferably, also in a manner which allows for it to be removed therefrom, when that is desired. While a most preferred embodiment of the present invention will be described with specific reference to a support pole or mast associated with an outdoor umbrella, it is emphasized that the locking assembly of the present invention can be utilized to removably, securely and automatically connect a variety of different stanchion-like structures to a supporting and/or anchoring base, the base preferably being of the type incorporating a sleeve-like mounting structure.

As such, the mounting sleeve is structured to receive a free, distal end of the mast or stanchion within its interior. The umbrella or other assembly associated with the stanchion is thereby removably connected to the base in a secure and safe manner. Distinguishing structural features of the locking assembly further facilitate the quick and easy removal and release of the mast or stanchion with minimal manual manipulation thereof. For purposes of clarity, the term "stanchion" will be used to generally describe any of a plurality of masts or support poles associated with an outdoor umbrella or any type of elongated, substantially upright supporting structure associated with a variety of devices or assemblies, other than outdoor umbrellas.

More specifically, the one or more preferred embodiments of the locking assembly of the present invention comprise a mounting structure connected to a base or like anchoring device, wherein the mounting structure removably receives or is otherwise connected to the free or distal end of the stanchion. The mounting structure may be fixedly connected, integrally secured or otherwise attached to the base and structured to interconnect the stanchion to the base in an intended and supported manner. A locking assembly is connected to the mounting structure by being at least partially fixed on an exterior portion thereof.

Further, the locking assembly includes a locking member pivotally or otherwise movably disposable between what may be referred to as a locked orientation and a released orientation. As will be explained in greater detail hereinafter, the locked orientation of the locking member may be at least partially defined by an end or head portion of the locking member is disposed in interruptive engagement with an exterior portion of the stanchion which is disposed on the interior of the mounting structure. In contrast, the aforementioned released orientation of the locking member may be defined by a sliding engagement of the end or head portion or other portion of the locking member with an exterior portion of the stanchion disposed within the mounting structure. When in the released orientation the locking member will not interruptively interfere with the movement of the end portion of the stanchion into or out of the mounting structure. In addition and as also explained in greater detail hereinafter, in at least one embodiment of the locking assembly, the aforementioned released orientation may also be defined by disposition of the end or head portion of the locking member substantially out of engagement with the distal end of the stanchion and at least partially out of the interior of the mounting structure. It is of further note that the mounting structure may comprise an elongated sleeve like configuration having an open end and a hollow interior along at least a portion of the length thereof. However, the mounting structure can be defined by a variety of other structures, configurations, dimensions, etc. as long as there is cooperative structuring and functioning between the distal end or other engaged portion of the stanchion and the mounting structure which facilitates interconnection, support and positioning of the stanchion relative to the base in an intended manner.

As set forth above, one feature of a most preferred embodiment of the locking assembly of the present invention comprises the ability to automatically secure and removably connect or "lock" the stanchion to the base through interconnection with the mounting structure. This automatic, secure connection is accomplished without the need for manual manipulation of the locking assembly or any parts associated therewith. Similarly, the reliability of the locking assembly of the present invention provides enhanced safety features which require manual positioning of the locking member into the aforementioned released position, thereby ensuring that the stanchion cannot be inadvertently removed or detached from the supporting base due to ambient wind conditions or accidentally by an attending individual.

In at least one of the preferred embodiments of the present invention, accomplishment of the automatic, locking interconnection of the stanchion to the supporting base is facilitated by the structure, configuration and/or disposition of a head portion of the locking member relative to the distal end or other portion of the stanchion which is received by the mounting sleeve. Moreover, the end portion includes a curvilinear outer surface and as set forth above, the end portion in this preferred embodiment is disposed and structured to substantially define a head portion of the locking member. Moreover, the end or head portion is configured to serve as and be more specifically defined as a cam structure. The cam structure is capable of establishing both a sliding, non-interruptive engagement with exterior portions of the stanchion end and an interruptive engagement with predetermined exterior surface portions of the stanchion located within the mounting sleeve. As will be described in greater detail hereinafter, the aforementioned interruptive engagement or disposition of the cam-like head portion of the locking member will serve to removably but securely connect the inserted end of the stanchion to the mounting structure. Moreover, the removal of the stanchion from the mounting structure and the base can only be accomplished by a purposeful, manual manipulation of the locking member into the aforementioned released orientation.

Accordingly, many of the various problems and disadvantages associated with conventional and prior art devices and assemblies for connecting a stanchion to a support base or like anchoring structure are overcome by virtue of the automatically operable locking assembly, as described in greater detail hereinafter with reference to the accompanying drawings. Further, a secure but removable interconnection of the stanchion to the supporting base is accomplished, while preventing inadvertent removal thereof by requiring at least a minimal manual manipulation of the locking assembly into the released orientation.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
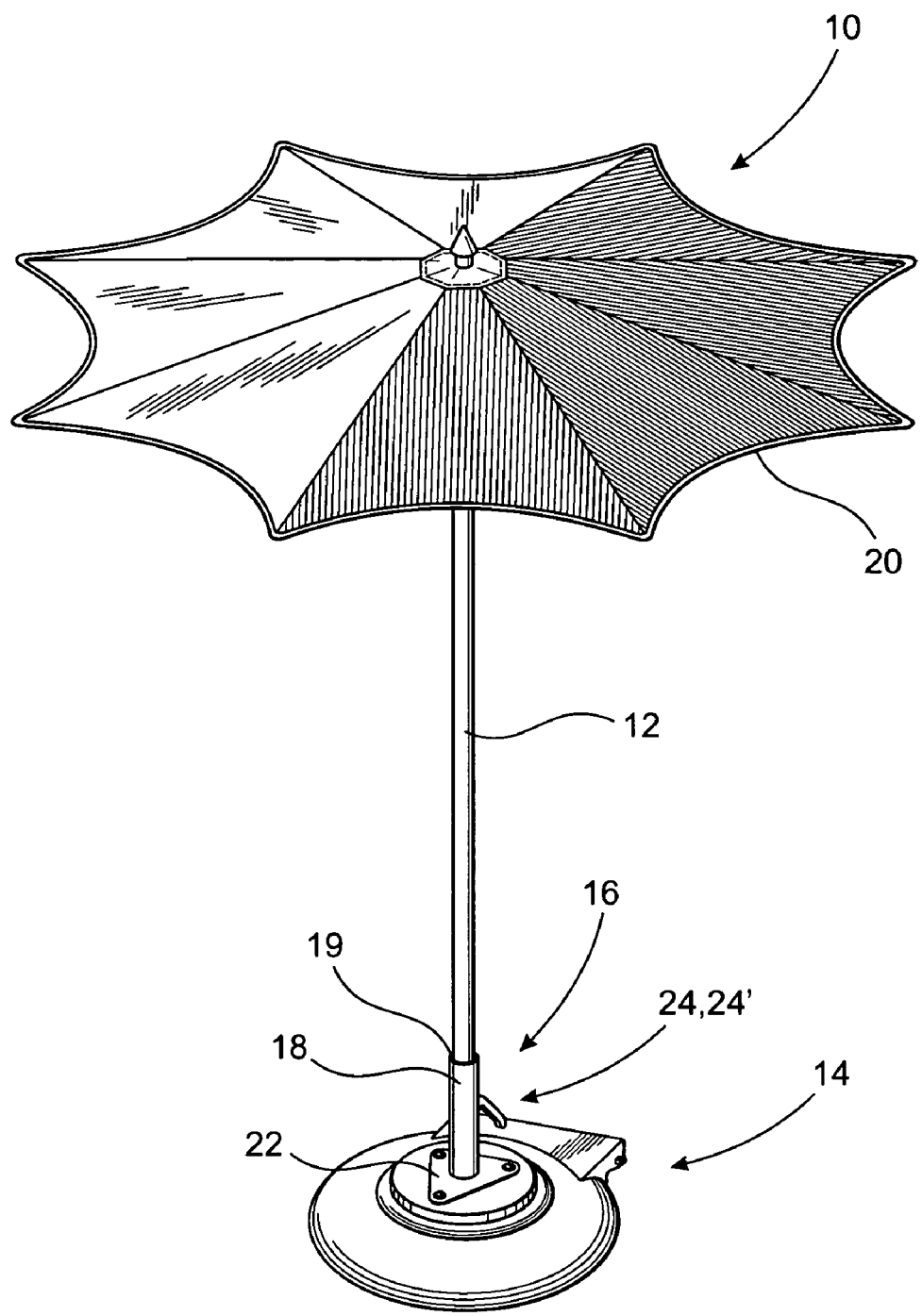
FIG. 1 is a perspective view of an outdoor umbrella having a mast or stanchion shown with a preferred embodiment of the present invention for achieving the removable, locking engagement of the mast or stanchion to a supporting base.

As shown in the accompanying drawings, the present invention is directed to a locking assembly which is structured to removably secure an outdoor umbrella or like structure 10 in an operative position, as demonstrated in FIG. 1. More specifically, a central or otherwise positioned mast, support pole or stanchion 12 is removably secured to a supporting base 14 by being interconnected thereto through the provision of a mounting structure, generally indicated as 16.

As is well-known, an umbrella assembly 10, especially when utilized in an outdoor environment, can be subjected to lifting forces and the like even during light to moderate wind conditions, when the canopy 20 is in its expanded or operative position. At times, such external forces can have the strength and ability to separate the mast 12 from the supporting base 14 by detachment from the mounting structure 16. Such inadvertent removal or detachment of the umbrella assembly 10 from its intended, supported position as represented in FIG. 1 provides hazardous conditions to persons and/or property in the area where the umbrella assembly 10 is located, as well as possibly causing damage or destruction to umbrella itself, or various components associated with the umbrella assembly 10. Accordingly, one feature of the present invention is to provide a secure, stable and "automatically" activated locking assembly, generally indicated as 24 in FIG. 1 and represented in detail in FIGS. 2 through 8. Moreover, the locking assembly 24 will maintain the umbrella assembly 10, and in particular, the stanchion 12 in its upright, supported position relative to the base 14 and the mounting structure 16.

As used herein, the base 14 may assume a variety of different dimensions and configurations and may differ significantly in its overall structure. Conventionally, the weight of support base 14, of the type represented herein, may vary dependent upon the object or device being supported. However, many support bases 14 are intentionally made to be sufficiently heavy or be otherwise "anchored" to provide adequate stability to the object or assembly being supported, such as the umbrella assembly 10. This is especially true when the umbrella or other supported device is positioned in an outdoor environment. As also represented in FIG. 1, the canopy 20 is normally connected to the upper end or portion of the supporting stanchion 12, wherein the lower or distal end or portion of the mast 12 is interconnected to the supporting base 14 such as by being inserted and retained within the interior of the mounting structure 16.

Moreover, connection of the mast or stanchion 12 is accomplished by inserting the lower or distal end thereof within a mounting sleeve or like portion 18 of the mounting structure 16. The sleeve 18 has an at least partially hollow interior along at least a portion of its length and an open outer, exposed end 19. The opposite end of the mounting sleeve 18 is fixedly and/or integrally connected to the base 14, such as by means of a connecting flange or plate 22. Fixed and/or permanent interconnection between the mounting structure 16 and the base 14 may be accomplished by a variety of different connection or attachment structures other than the connecting plate 22. Also, the connecting plate 22 may include different configurations adaptable to the dimension and/or configuration of the base 14.

With primary reference to FIGS. 2 through 8, a most preferred embodiment of the present invention comprises the locking assembly generally indicated as 24 being at least partially disposed on an exterior of the sleeve 18 of the mounting structure 16. More specifically, the locking assembly 24 includes a locking member generally indicated as 26 comprising an end portion or head portion 28 and an elongated arm 30 integrally or otherwise fixedly connected to the end or head portion 28 and movable therewith. The locking member 26 is pivotally or otherwise movably connected to the mounting structure 16 such as by a mounting or pivot pin 32 connected to and extending between supporting flanges or ears 34. As represented, the supporting flanges 34 are fixedly secured to the exterior surface of the mounting sleeve 18 so as to provide adequate support for the locking member 26 at least partially by its connection to mounting pin 32.

Figure 2:
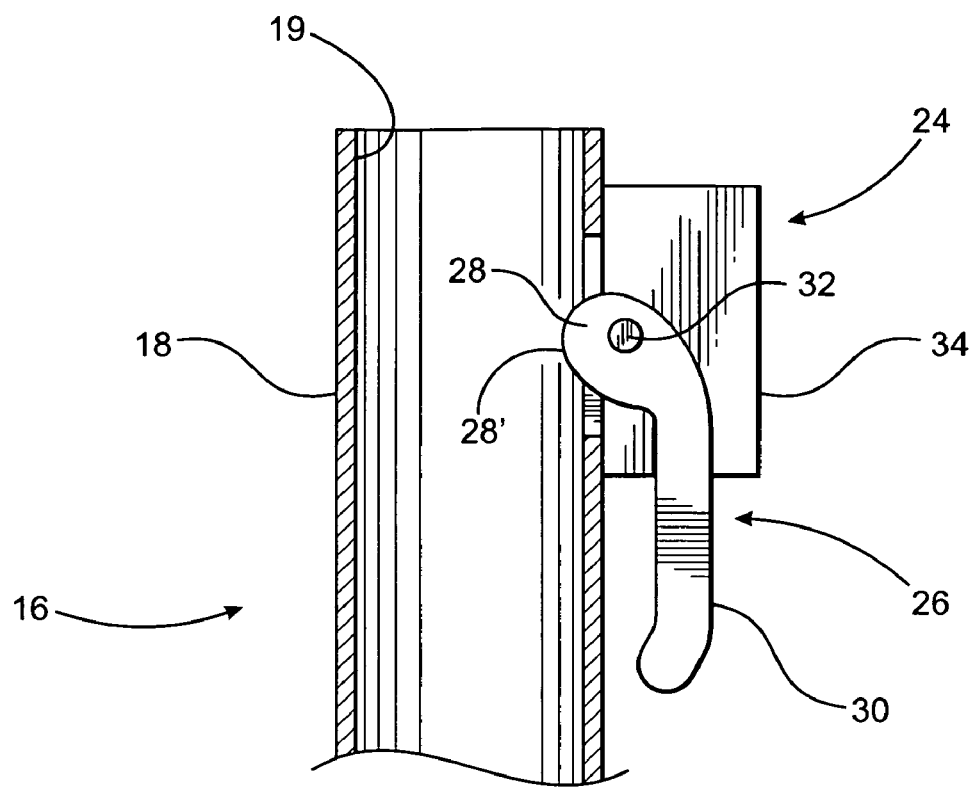
FIG. 2 is a sectional view in partial cutaway of a locking assembly associated with the preferred embodiment illustrated in FIG. 1.
Figure 3:
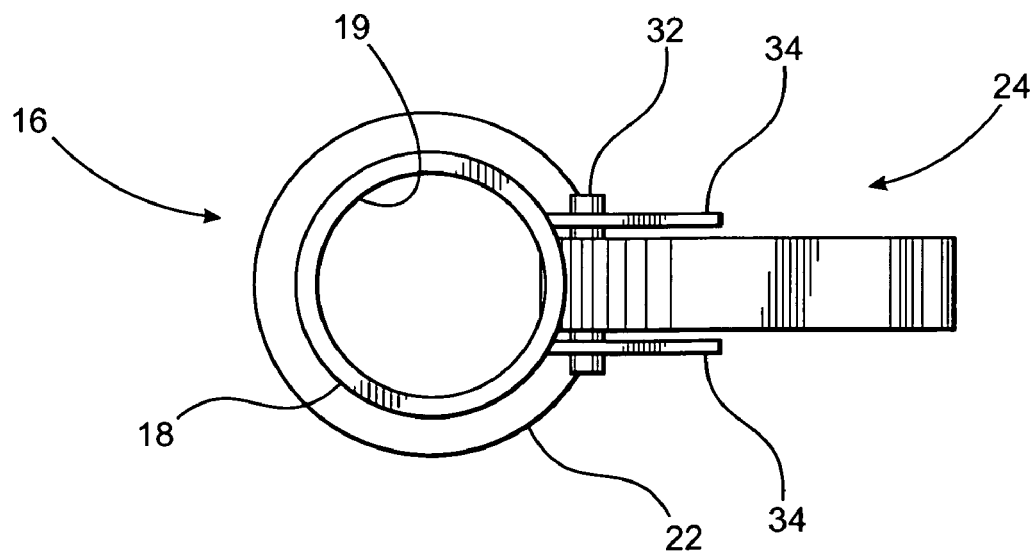
FIG. 3 is a top view of the locking assembly of the embodiment of FIG. 2, including a locking member represented in the position of FIGS. 5 and 8.
Figure 4:
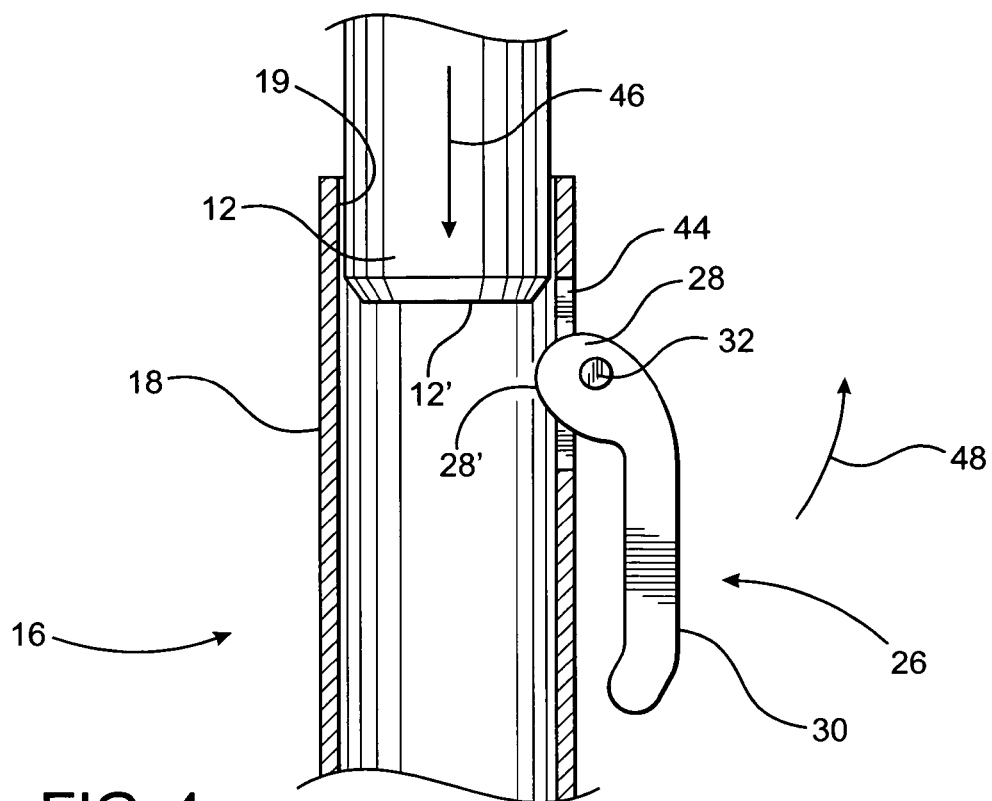
FIG. 4 is a sectional view in partial cutaway of the locking assembly of the embodiment of FIGS. 2 and 3 in a released orientation.
Figure 6:
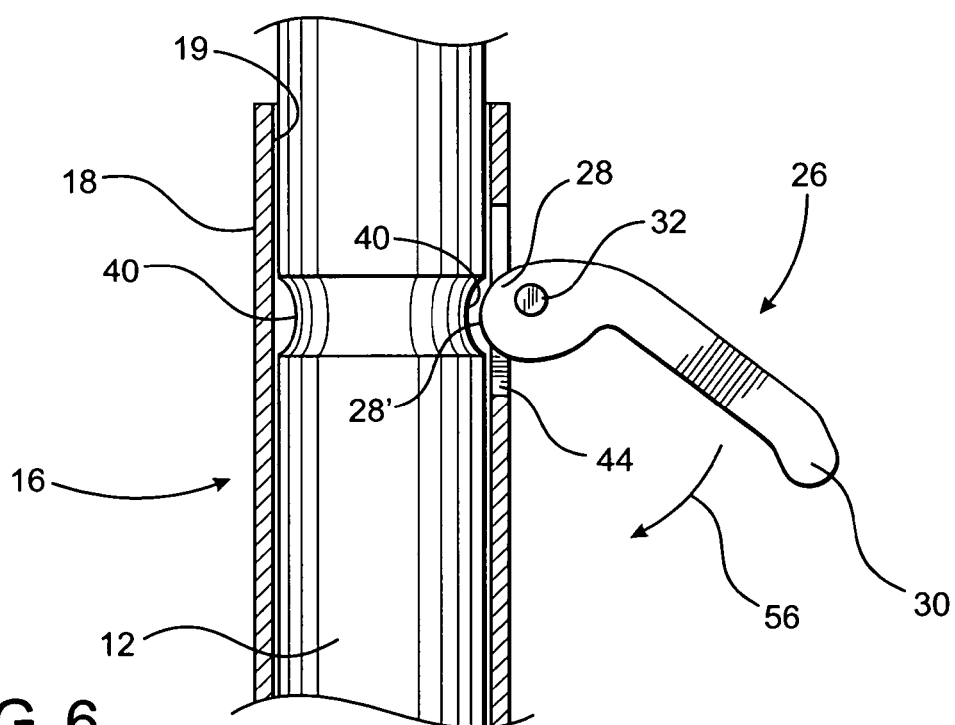
FIG. 6 is a sectional view in partial cutaway of the locking assembly of the embodiments of FIGS. 2 through 5, wherein the locking member is moving from an at least partially released orientation into a locked orientation.
Figure 7:
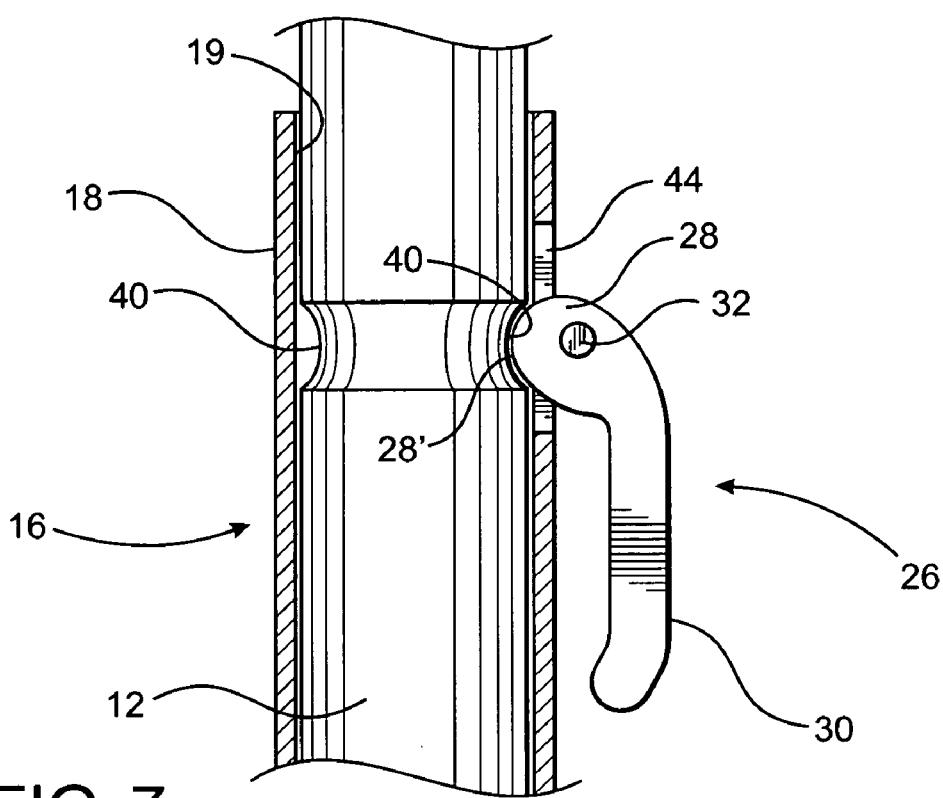
FIG. 7 is a sectional view in partial cutaway of the embodiment of FIGS. 2 through 6, wherein the locking member is in a locked orientation.
Figure 8:
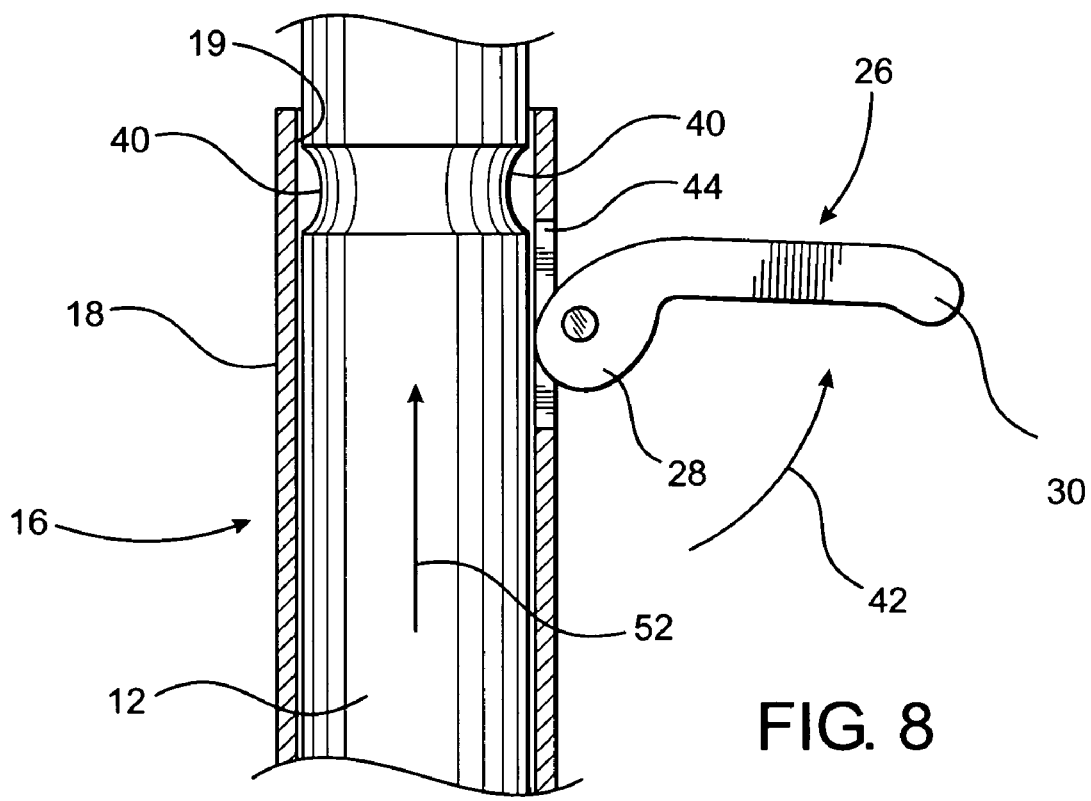
FIG. 8 is a sectional view in partial cutaway of the embodiment of the locking assembly of FIGS. 2 through 7, wherein the locking member is manually positioned out of the locked orientation of FIG. 7 into a released orientation.

The pivotal or other movable mounting and positioning of the locking member 26 enables it to be disposed into and between a fully locked orientation as demonstrated in FIGS. 2, 4 and 7 and a fully released orientation as demonstrated in FIG. 8. The pivotal or otherwise movable connection of the locking member 26 relative to the mounting sleeve 18 further facilitates it assuming a variety of additional orientations, as demonstrated in FIGS. 3, 5 and 6, as it is automatically or manually positioned between the fully locked orientation of FIGS. 2, 4 and 7 and the fully released orientation of FIG. 8.

When in the locked orientation, as primarily represented in FIG. 7, the locking member 26 and in particular the end portion or head portion 28 is disposed into what may be referred to as an "interruptive" position relative to a predetermined portion of the mast or stanchion 12, which is disposed within the interior of the mounting sleeve 18. When in this fully locked orientation, the head portion 28 engages and "interrupts" a predetermined exterior surface portion 40, of the stanchion 12. The distal end of stanchion 12 is thereby prohibited from being removed from the interior of the mounting sleeve 18 until the locking member 26 is purposely and manually disposed into the released orientation as demonstrated in FIG. 8. Directional arrow 42 provides a schematic representation of a lifting or upwardly directed force exerted on the arm 30 of the locking member 26, such as by a finger, hand or other gripping facility of an individual authorized to remove the stanchion 12 from its supported, upright, operative position, as demonstrated in FIG. 1.

In order to automatically assume the locked orientation of FIG. 7, the locking member 26 and specifically the end portion or head portion 28 includes a predetermined structure. Also, when the stanchion is absent from the interior of the mounting sleeve 18, the head portion 28 is normally and at least partially disposed into the interior of the mounting sleeve 18 through an appropriately dimensioned and positioned, opening or window 44 formed in the side wall of the mounting sleeve 18 as represented in FIG. 2. Moreover, the predetermined structure and configuration of the end or head portion 28 comprises a cam structure. The cam structure or configuration of the head portion 28, as well as its normal disposition relative to the mounting sleeve 18 before the entry therein of the stanchion 12, facilitates the "automatic" disposition of the locking member 26 out of the normal position of FIG. 2 and eventually into the locked orientation of FIG. 7. As set forth above, the head portion 28 is automatically disposed into the aforementioned interruptive engagement with a predetermined exterior surface portion 40 of the stanchion 12.

The cam structure or cam-like configuration of the end or head portion 28 is at least partially defined by a curved exterior surface portion 28' which extends into the interior of the mounting sleeve 18 when oriented as demonstrated in FIGS. 2, 4 and 7. It should also be noted that the curved exterior surface 28' is cooperatively dimensioned and configured with the predetermined exterior surface portion 40 of the stanchion 12 to facilitate the locking, interruptive engagement therewith. Cooperative dimensioning and structuring of the exterior surface or cam structure 28' and the predetermined exterior surface portion 40 of the stanchion 12 also facilitates and/or enables the locking member 26 to automatically assume the locked orientation and interruptive engagement demonstrated in FIG. 7.

Figure 5:
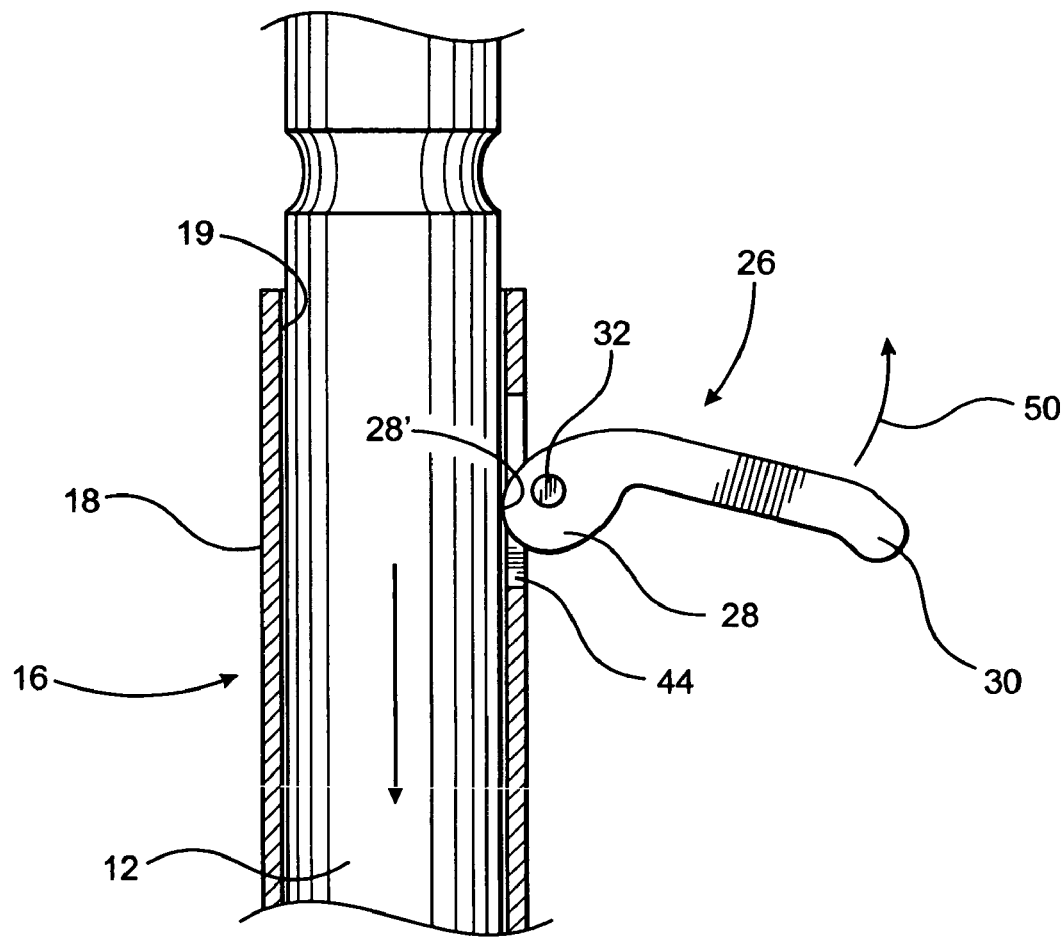
FIG. 5 is a sectional view in partial cutaway of the locking assembly of FIGS. 2 through 4 with the locking member forced into an at least partially released orientation.

In use and with primary reference to FIG. 2, when the mounting sleeve 18 is not occupied by the distal end of the stanchion 12, the locking member 26 will normally assume an initial orientation which may also be described as the "released" orientation, as set forth in greater detail hereinafter. This initial and or released orientation is accomplished, at least in part, due to the pivotal connection of the locking member with or about the pin 32 as well as the influence of gravity on the locking member 26. With reference to FIGS. 4 and 5, upon entry of the stanchion 12 through the open end 19 and passage thereof into and along the interior of the mounting sleeve 18, as represented by directional arrow 46, the free or lowermost extremity 12' of the stanchion 12 will engage the curved exterior surface 28' defining the cam structure portion of the head 28. Such engagement will cause an outwardly and upwardly pivotal movement of the locking member 26 as demonstrated by directional arrow 48 in FIG. 4. As the distal extremity 12' passes the head portion 28 and the window 44, correspondingly disposed exterior surface portions of the stanchion 12 will come into sliding engagement with the exterior curved surface 28', as demonstrated in FIG. 5. This continuous sliding engagement will maintain the locking member 26 in an outwardly extending, at least partially raised position as demonstrated by directional arrow 50.

However, once the head portion 28 comes into alignment with and is correspondingly positioned with the predetermined, exterior surface portion 40 of the stanchion 12, the locking member 26 will begin to rotate inwardly and/or downwardly, under the influence of gravity, as schematically represented in FIG. 6 by directional arrow 56. This inward and/or downward movement 56 of the locking member 26 is permitted due to the cooperative dimensions and configurations of the surface 28' and the exterior surface portion 40 of the stanchion 12 as also represented in FIG. 6.

Accordingly, the locking member 26 will eventually and automatically assume its fully locked orientation as demonstrated in FIG. 7. As such, the head portion 28 and in particular the exterior surface 28' of the locking member 26 will be disposed in interruptive engagement with the exterior of the stanchion 12 as the head portion 28 passes at least partially into the annular or circular recessed surface defining the predetermined exterior portion 40 of the stanchion 12.

As set forth above, in order to prevent inadvertent or forced removal of the stanchion from its locked and secured position on the interior of the mounting sleeve 18, the locking member 26 must be manually or otherwise deliberately disposed into the fully released orientation represented in FIG. 8. This released orientation serves to position the head portion 28 substantially or at least partially out of the window 44 and also out of its interruptive engagement with the recessed surface portion defining the predetermined exterior surface portion 40 of the stanchion 12, as represented in FIG. 7. The stanchion 12 is then allowed to be withdrawn outwardly and removed from the interior of the mounting sleeve 18 through the open end 19, as schematically demonstrated by directional arrow 52.

Figure 6A:
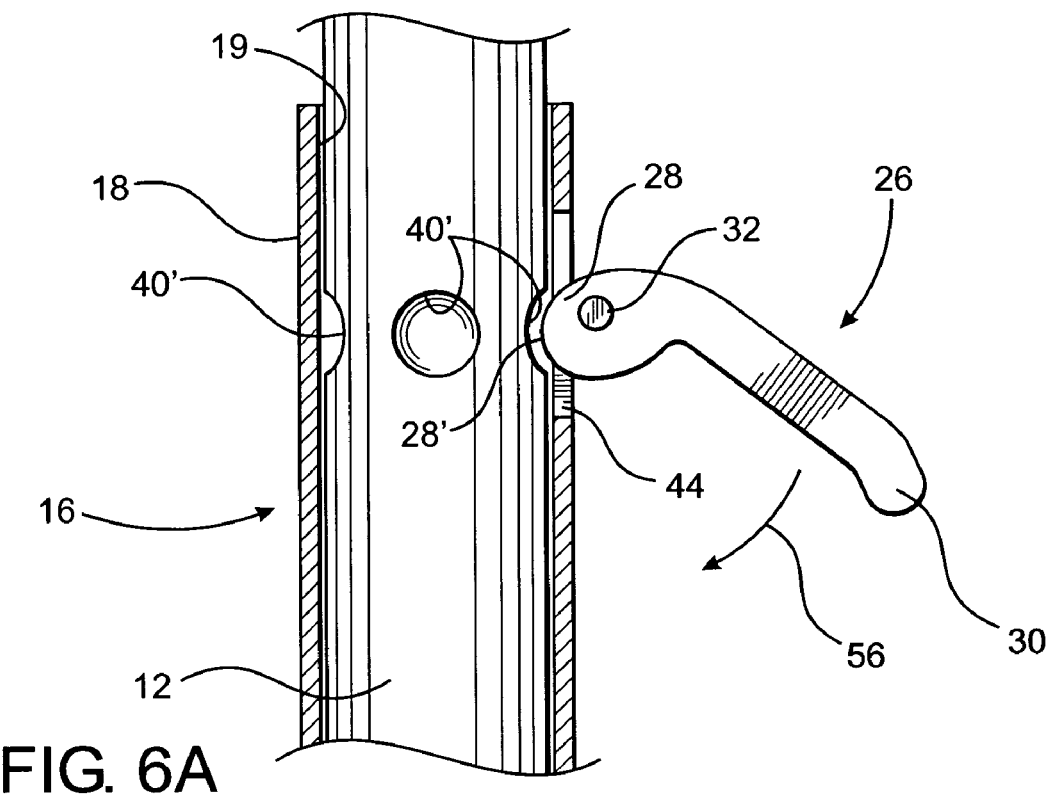
FIG. 6A is a sectional view in partial cutaway of another preferred embodiment of the locking assembly functionally similar to, but structurally distinguishable from, the embodiment of FIG. 6.
Figure 6B:
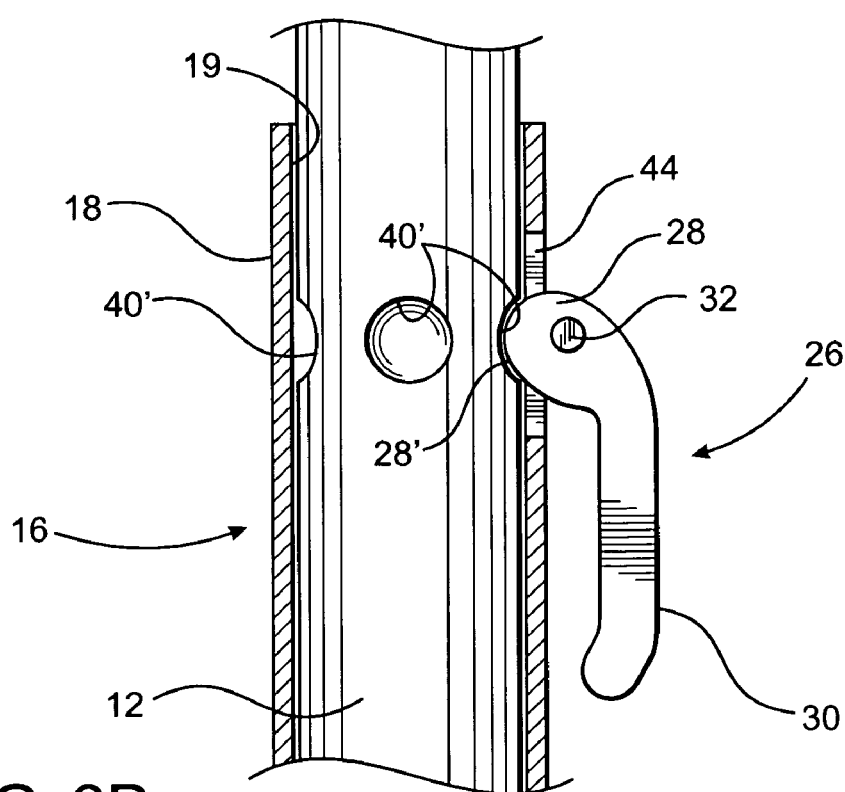
FIG. 6B is a sectional view in partial cutaway of the embodiment of FIG. 6A in a locked orientation.

Accordingly, one preferred embodiment of the present invention comprises the predetermined exterior surface portion 40 having an at least partially circular or annular configuration extending substantially continuously and transversely about the periphery of the stanchion 12. However, another preferred embodiment of the present invention is represented in FIGS. 6A and 6B, wherein the predetermined external surface portion comprises at least one, but preferably a plurality of "dimples" or "recessed surface segments" 40' disposed in spaced relation to one another. Moreover, when a plurality of the recessed surface segments 40' are provided, they are collectively disposed in an annular array which surrounds or at least partially extends about the periphery of the stanchion 12 in transverse relation to the length thereof.

Accordingly, when the recessed surface segments 40' are utilized, the locking member 26 passes into the aforementioned interruptive locking engagement with the stanchion 12 when the head portion 28 and locking surface 28' become aligned with one of the recessed surface segments 40'. When such alignment occurs, each of the one or more recessed surface segments 40' are sufficiently and cooperatively configured relative to the head portion 28 and/or locking surface 28' to allow the locking member 26 to assume the fully locked orientation as represented in FIG. 6B. Further, one preferred structuring of one or more of the recessed surface segments 40' includes a generally round, oval or similar configuration having a generally concave interior portion.

As with the additional preferred embodiments of FIGS. 6, 7 and 8, the fully locked orientation of the embodiment of FIGS. 6A and 6B may be at least partially defined by the locking member 26 and more specifically the head portion 28 and locking surface 28' being disposed in interruptive engagement with the predetermined exterior surface portion comprising the one or more recessed surface segments 40'. Moreover, the interruptive engagement of the locking member 26 and head portion 28 may be more specifically defined by the locking surface 28' being at least partially disposed within an aligned one of the one or more recessed surface segments 40' and in confronting engagement with interior portions thereof. As with the embodiments of FIGS. 6, 7, and 8, the preferred embodiment of FIGS. 6A and 6B may easily and efficiently be disposed in the released orientation by manually exerting a lifting, pulling or generally upwardly directed force 42 on the locking member 26, as schematically represented in the embodiment of FIG. 8.

Figure 6C:
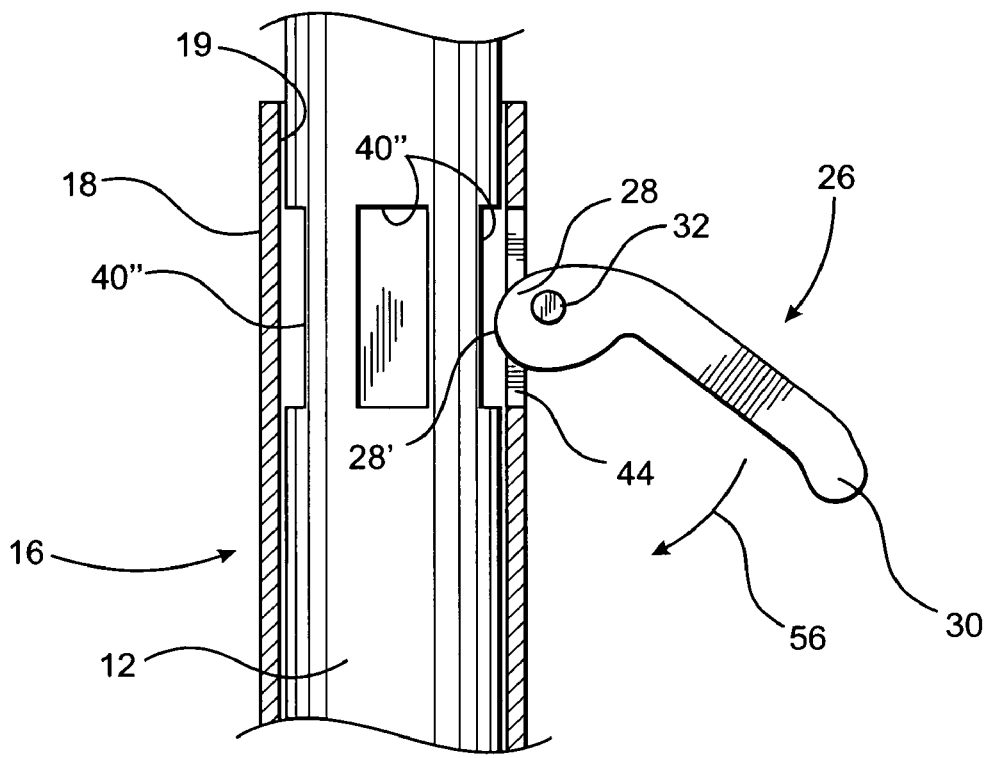
FIG. 6C is a sectional view in partial cutaway of yet another preferred embodiment of the locking assembly functionally similar to, but structurally distinguishable from, the embodiments of FIGS. 6, 6A and 6B.
Figure 6D:
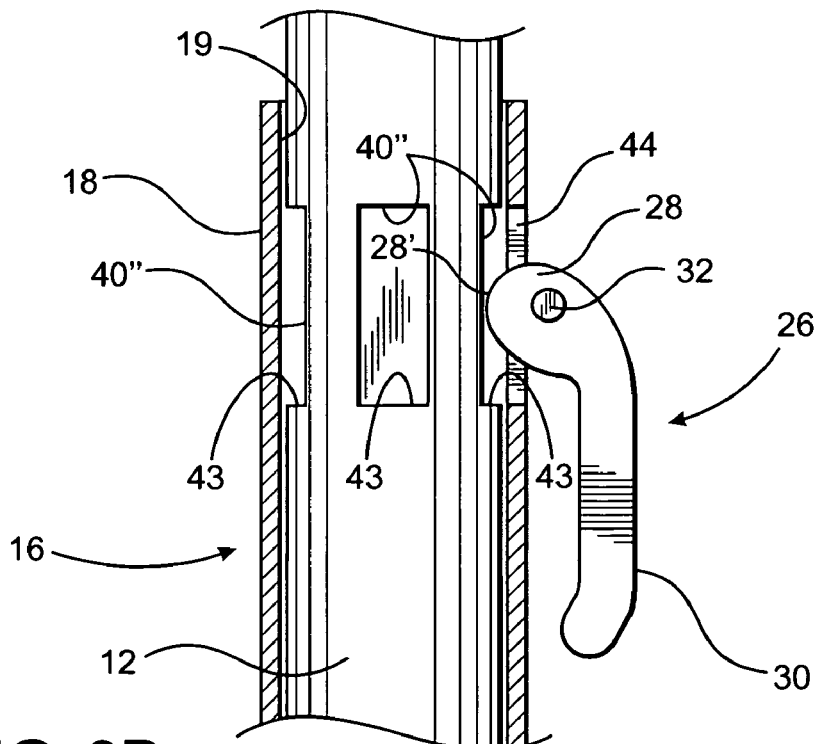
FIG. 6D is a sectional view in partial cutaway of the embodiment of FIG. 6C in a locked orientation.

Yet another preferred embodiment of the present invention is represented in FIGS. 6C and 6D wherein the predetermined external surface portion comprises at least one but preferably a plurality of elongated recessed surface segments 40". When a plurality of the elongated recess surface segments 40" are utilized, they are disposed in spaced relation to one another and are collectively disposed in a partially or substantially annular array, which surrounds or at least partially extends transversely about the periphery of this stanchion 12.

Therefore, when the recessed surface segments 40" are utilized, the locking member 26 passes into the aforementioned interruptive locking engagement with the stanchion 12 when the head portion 28 and locking surface 28' become aligned with one of the elongated recessed surface segments 40". When such alignment occurs, each of the one or more recessed surface segments 40" are sufficiently and cooperatively configured relative to the head portion 28 and/or locking surface 28' to allow the locking member 26 to assume the fully locked orientation as represented in FIG. 6D. As with the additional preferred embodiments of the locking assembly, as demonstrated in FIGS. 6A, 6B, 7 and 8, the fully locked orientation of the embodiment of FIGS. 6C and 6D may be at least partially defined by the locking member 26 and more specifically the head portion 28 and the locking surface 28' being disposed in interruptive engagement with the interior of a correspondingly positioned one of the recessed surface segments 40". Moreover, the interruptive engagement of the locking member 26 and the head portion 28 may be more specifically defined by the locking surface 28' being at least partially disposed within an aligned one of the recessed surface segments 40" and in confronting engagement with one or more interior portions thereof such as at a lower most end or ledge 43. As with the embodiments with FIGS. 6, 6A, 6B, 7 and 8, the preferred embodiment of FIGS. 6C and 6D may be easily and efficiently disposed in the released orientation by manually exerting a lifting, pulling or generally upwardly directed force 42 on the locking member 26 as schematically represented in FIG. 8.

However, absent the manual lifting, pulling or generally upwardly directed force 42 on the locking member 26, any attempt to remove the stanchion 12 from its locked position as demonstrated in FIG. 6D will result in the head 28 and the locking surface 28' coming in to abutting, interruptive engagement with at least the lower most end or ledge 43 of a corresponding one of the recessed surface segments 40". Therefore unintended or inadvertent removal of the stanchion 12 from the sleeve 18, such as during strong wind conditions, will be prevented as long as the locking member 26 is in the locked orientation as demonstrated in FIGS. 6B, 6D and 7.

Accordingly, the assembly of the present invention thereby provides a convenient, quick and efficient "automatic" interconnection of the mast or stanchion 12 into the interior of the mounting sleeve 18 of the mounting structure 16 thereby serving to automatically secure it in its supporting relation on the weighted base 14. Release of the stanchion 12 is easily and efficiently accomplished by manually positioning the locking member 26 in the fully released orientation of FIG. 8. The problems and disadvantages associates with known or conventional interconnecting structures for securing a center pole and/or stanchion 12 through a base 14 are thereby overcome.

Figure 9:
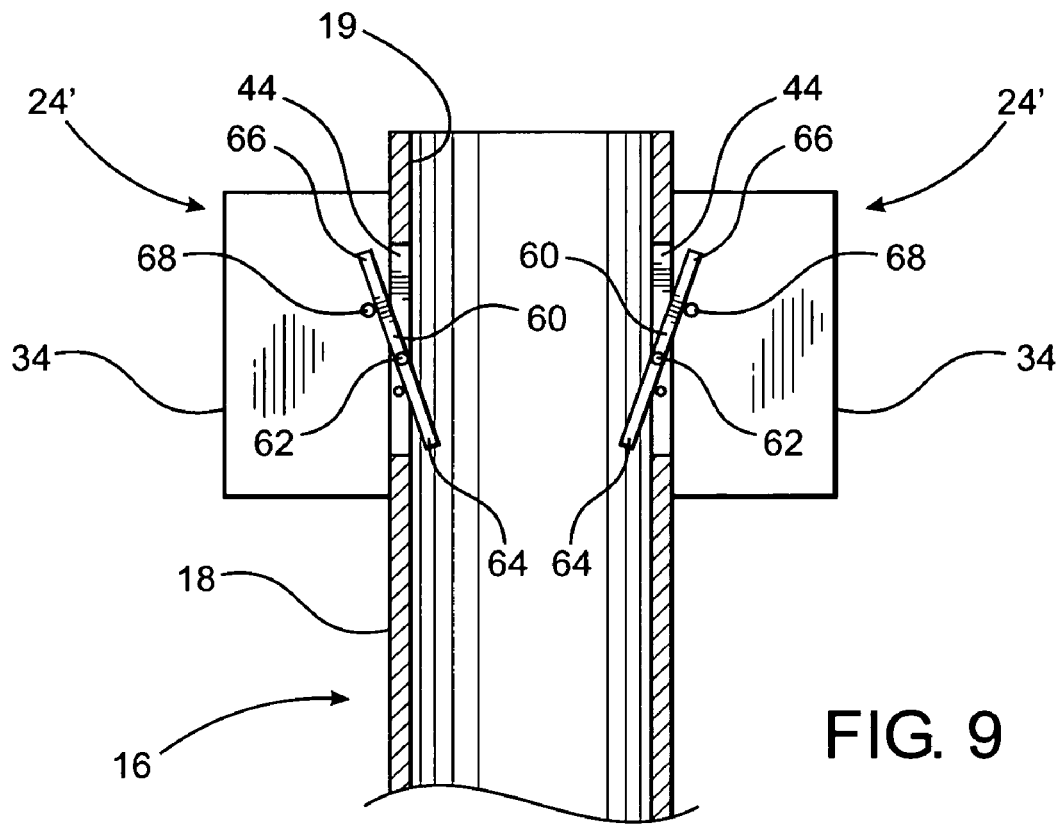
FIG. 9 is a sectional view in partial cutaway of yet another preferred embodiment of a locking assembly of the present invention which may be associated with the structure as illustrated in FIG. 1.
Figure 10:
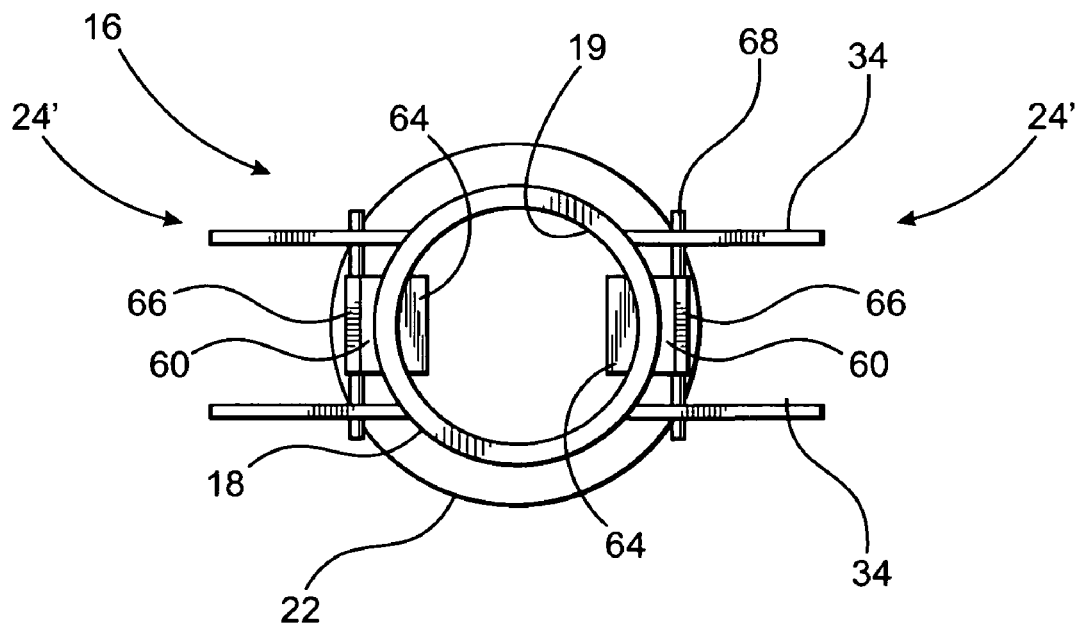
FIG. 10 is a top view of the embodiment of FIG. 9, wherein this embodiment of the locking assembly includes at least one but preferably a plurality of locking members.
Figure 11:
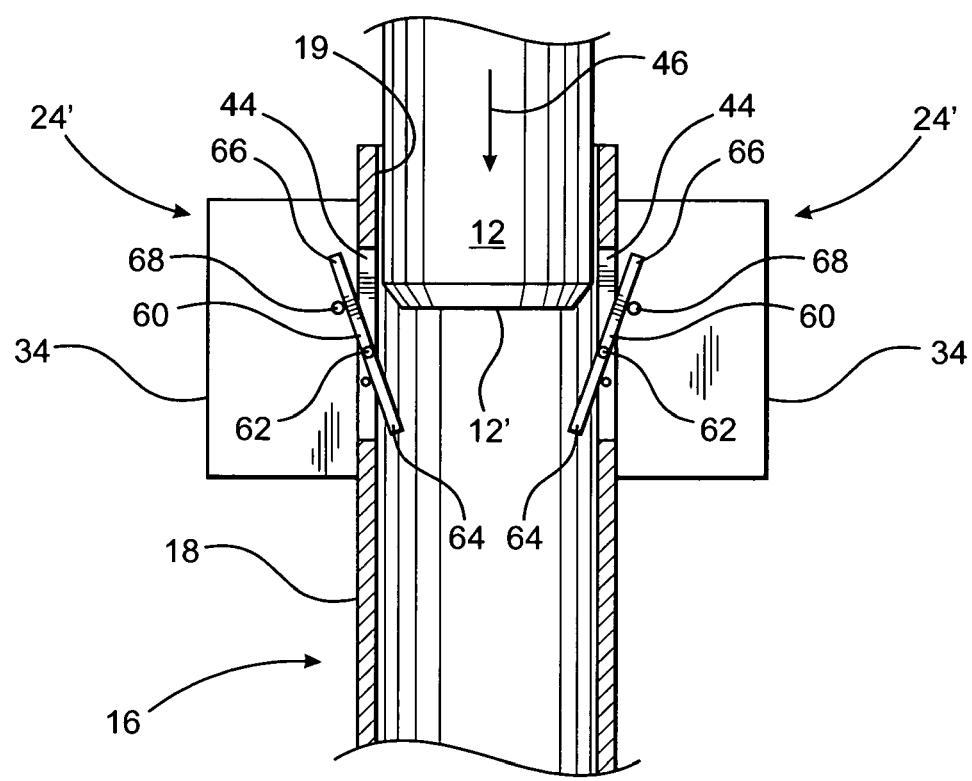
FIG. 11 is a sectional view in partial cutaway of the preferred embodiments of FIGS. 9 and 10, wherein one or more locking members are in an initial, released orientation upon the entry of a stanchion into the interior of a mounting assembly.
Figure 12:
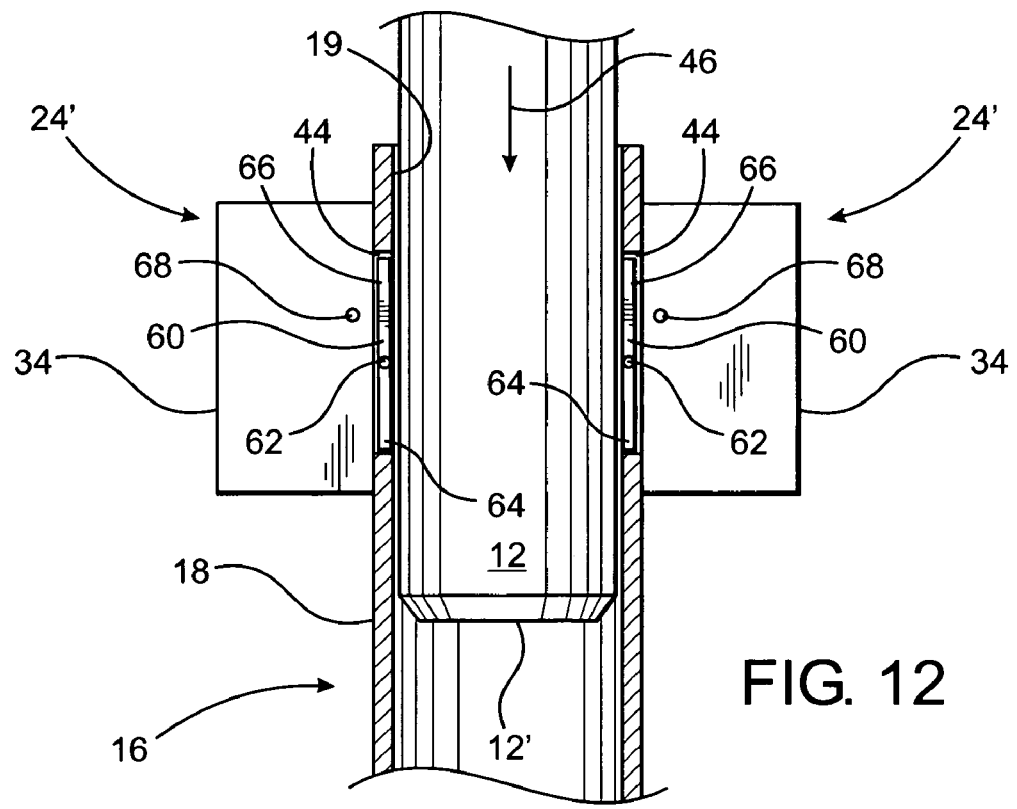
FIG. 12 is a sectional view in partial cutaway of the one or more locking members in a released orientation upon passage of the stanchion into and along the length of the mounting assembly.
Figure 13:
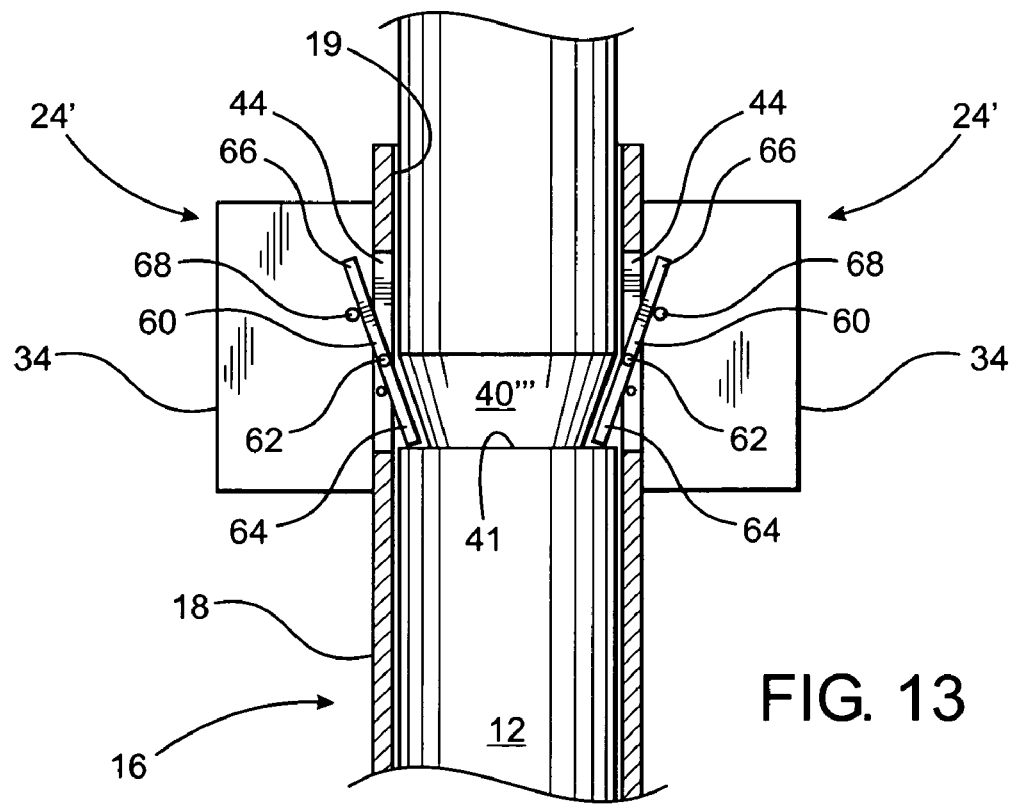
FIG. 13 is a sectional view in partial cutaway of the one or more locking members disposed in a locked orientation upon their alignment with a predetermined exterior surface portion of the stanchion.
Figure 14:
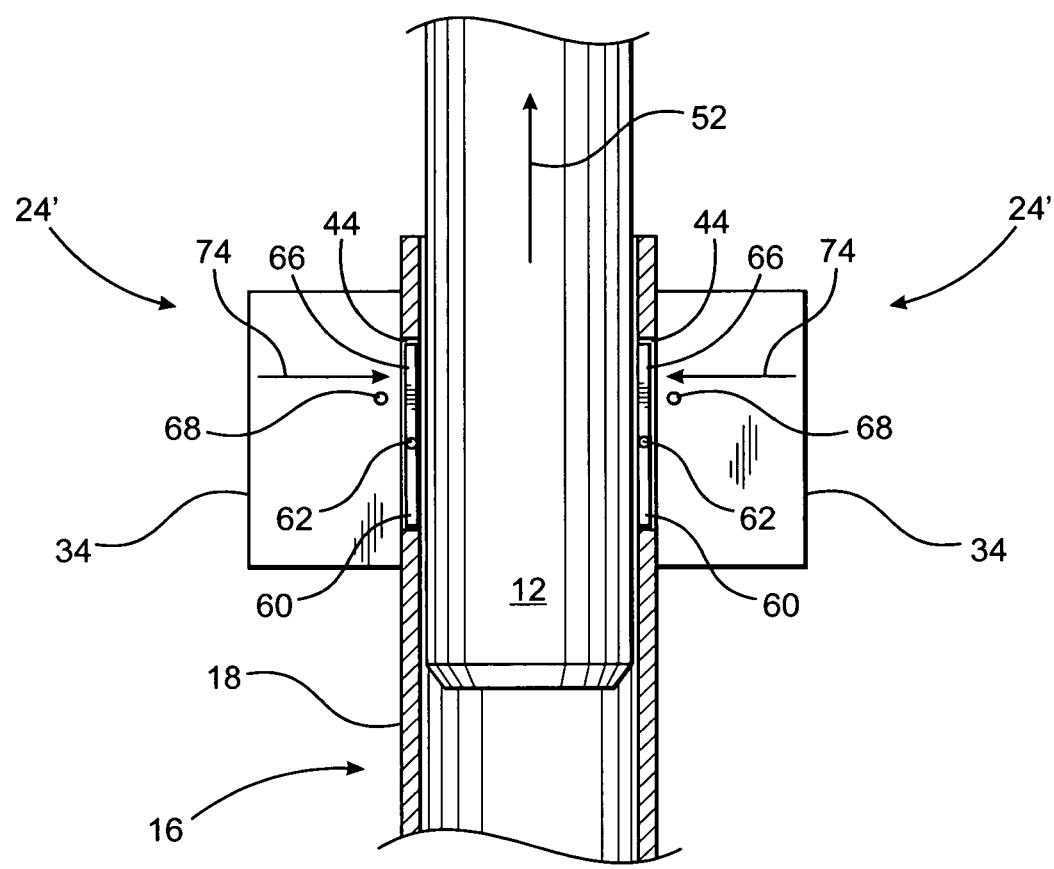
FIG. 14 is a sectional view in partial cutaway representing a withdrawal of the stanchion from the interior of a mounting assembly and the one or more locking members manually disposed in a released orientation.

With primary reference to FIGS. 9 through 15, the locking assembly of the present invention comprises yet another preferred embodiment generally indicated as 24'. More specifically, the locking assembly 24' includes one or more locking members 60 each pivotally or rotatably mounted on the sleeve 18 of the mounting assembly 16. Such pivotal or rotational mounting is provided by means of supporting pivot pins 62 secured to spaced apart flanges 34 and/or directly to the sleeve 18 of the mounting assembly 16. The pivot pins 62 serve to support the corresponding locking members 60 such that they may be automatically disposed in either an initial, operative orientation as represented in FIGS. 9 through 11, or a locked orientation as represented in FIG. 13 and manually disposed in a released orientation as represented in FIG. 14. It is emphasized that while the locking assembly 24' is represented in FIGS. 9 through 15 as comprising a plurality of movable locking members 60, this embodiment of the locking assembly 24' may be modified to include only a single locking member 60, as will be apparent from the more detailed description hereinafter provided.

Figure 15:
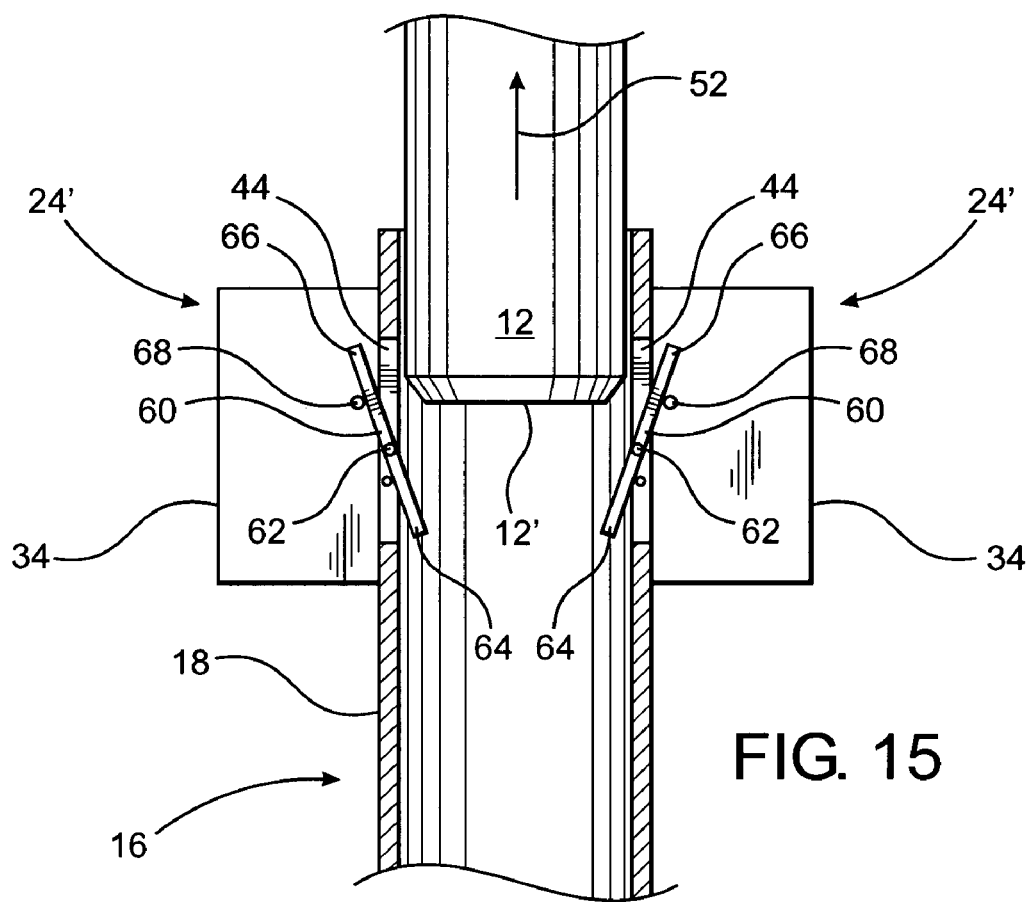
FIG. 15 is a sectional view in partial cutaway of a continued withdrawal of the stanchion from the interior of the mounting assembly, wherein the one or more locking members automatically assume an original position when no longer engaging or aligned with the stanchion.

Each of the one or more locking members 60 is structured to normally assume an initial, operative position as represented in FIGS. 9 and 15. This normally assumed operative position may be accomplished by the overall structuring of each of the locking members 60 to include a distal and/or first portion 64 being disposed inwardly into the interior of the mounting assembly 16 through a corresponding window 44. A second portion 66 is disposed exteriorly of the interior of the mounting assembly 16 relative to the correspondingly disposed windows 44, which are described in detail with regard to the preferred embodiments of FIGS. 2 through 8.

Further, the locked orientation of the one or more locking members 60 is further defined by the second portion 66 disposed in abutting, stopped relation to a correspondingly disposed stop member 68. As represented in FIGS. 9 and 10, the stop members 68 may be fixedly secured to corresponding ones of the flanges 34 so as to extend there between. In this position the stop members 68 will engage an exterior surface of the second portion 66 of each of the locking members 60.

It is further emphasized that the automatic biasing into the initial, operative position of each of the one or more locking members 60 into the orientation represented in FIGS. 9, 10 and 15 may be due to the location of the supporting pivot pins 62, the stop member 68 and/or the customized structuring of each of the one or more locking members 60. More specifically, each of the one or more second portions 66 may have a greater size and weight due at least in part to the location of the pivot pin 62 being below the mid-point of the locking member 60. Accordingly, when under the influence of gravity and not engaged or otherwise being influenced by the presence of a stanchion 12, the locking member(S) 60 will automatically and normally assume the original, initial operative position as represented in FIGS. 9 through 11, 15 and 16. When the stanchion is properly placed within sleeve 18, as described in greater detail hereinafter, the locking member(s) 60 will automatically assume the locked orientation as represented in FIG. 13.

Figure 16:
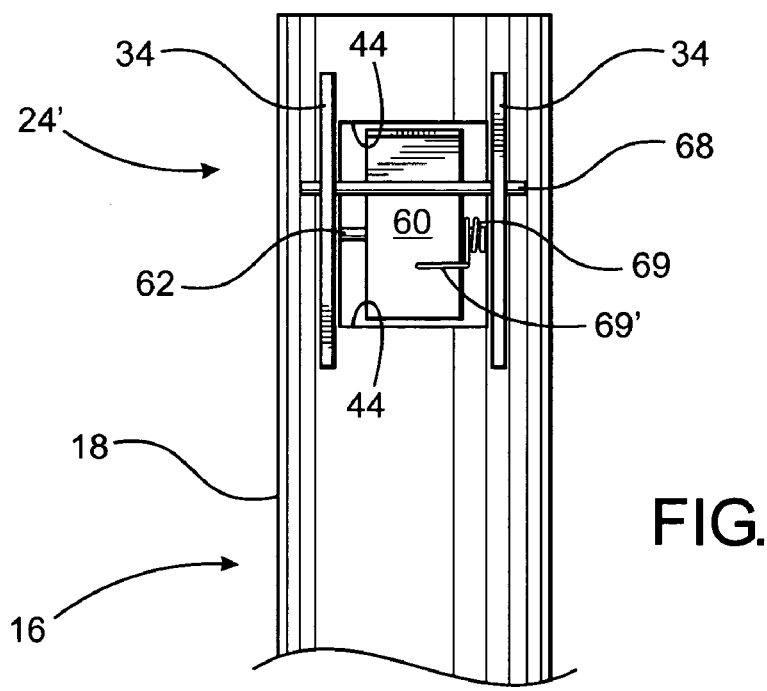
FIG. 16 is a front view in partial cutaway of yet another preferred embodiment of the present invention serving to normally bias the one or more locking members into an initial orientation and/or locking orientation.

Alternatively, the additional embodiment of FIG. 16 incorporates a biasing assembly generally indicated as 69, which may be in the form of a spring or other biasing structure. The biasing structure or assembly 69 may be associated with the pivot pin 62 or otherwise disposed in operative association with each of the one or more locking members 60. Moreover, the biasing assembly 69 may be in the form of a coil spring, having an outwardly depending finger as at 69' engaging the outer surface of the one or more locking members 60 below the disposition of the corresponding pivot pin 62. Accordingly, the force exerted on the one more locking members 60 by a corresponding biasing assembly 69 serves to force the locking members 60 into the aforementioned initial or operative position of FIGS. 9 through 11, 15 and 16, as well as the locking orientation of FIG. 13.

Absent the influence of a stanchion 12 within the interior of sleeve 18 of the mounting assembly 16, the one or more locking members 60 will assume an initial, operative position demonstrated in FIGS. 9 through 11. However, as the stanchion 12 enters the interior of the mounting assembly 16, as through the open end 19 of sleeve 18 and in accord with the directional arrow 46 represented in FIG. 12, the end 12' of the stanchion 12 will eventually be disposed in corresponding and engaging relation to the one or more locking members 60 and in particular the first portions thereof as at 64. With further reference to FIG. 12, continued passage of the stanchion 12 in accordance with the directional arrow 46 into the interior of the sleeve 18 of the mounting assembly 16 will automatically dispose the one or more locking members 60 into the released orientation. This is due to the fact that the outer surface of the stanchion 12 will movably engage and force the first portion 64 outwardly from the interior of the sleeve 18. Accordingly, the released orientation represented in FIG. 12, comprises the one or more locking members 60 disposed in substantially aligned relation to the corresponding windows 44. However, in this position the first portions 64 and/or other portions of the locking members 60 may be partially offset from alignment with the windows 44 while slidingly engaging the outer surface of the stanchion 12 during its progressive travel into and along the length of the sleeve 18.

With reference to FIG. 13, the stanchion 12 includes a predetermined exterior surface area 40''' defined by an undercut or recessed area and a ledge portion 41. The predetermined surface area 40''' and ledge 41, which is formed at a predetermined location along a length of the stanchion 12, will eventually pass into the interior of the sleeve 18 of the mounting portion 16. Therefore, when the predetermined exterior surface portion 40''' is substantially aligned with the one or more locking members 60, the one or more locking members 60 will automatically assume a locked orientation as demonstrated in FIG. 13. This is due to the fact that the one or more locking members 60 will normally be biased or structured to assume the initial, operative position of FIGS. 9 through 11 and 15. The position of the locking members 60 in these Figures is the same as the locking orientation as set forth in FIG. 13.

However, when in the locking orientation of FIG. 13 the first portions 64 and/or a distal ends of the one or more locking members 60 pass at least partially into the recessed exterior surface area 40''' and into abutting engagement with the ledge 41 formed as part of the recessed surface area 40'''. Moreover, the automatic disposition of the one or more locking members 60 into the locked orientation of FIG. 13 is accomplished by a normal or biased tendency of the one or more locking members 60 to automatically assume the initial operative orientation demonstrated in FIGS. 9 through 11, which will then define the locked orientation of the one more locking members 60 when they are disposed in alignment with the recessed exterior surface area or portion 40''' as represented in FIG. 13. Also while the recessed surface area 40''' of the stanchion 12 is aligned with the locking assembly 24', the provision of the aforementioned stop member 68 will facilitate maintenance of the one or more locking members 60 into locking, abutting engagement with the ledge 41 of the recessed exterior surface area 40'''. The stanchion 12 will thereby be prohibited from being inadvertently removed from the interior of the mounting assembly 16, such as during the presence of uplifting forces on the umbrella 10, which may be caused by high wind conditions or the like.

However, when it is desired to remove the stanchion 12 from the interior of the mounting assembly 16, the one or more locking members 60 are manually positioned into the released orientation as demonstrated in FIG. 14. Such an intended, manual positioning of the locking member 60 in the released orientation of FIG. 14 is accomplished by inwardly directed forces being exerted on the second portions 66 of each of the one or more locking members 60, as schematically indicated by directional arrows 74. Therefore, when the one or more locking members 60 are in the released orientation they are out of abutting, interruptive engagement with the recessed exterior surface portion 40''' and/or the locking ledge 41 of the stanchion 12.

With reference to FIG. 15, continued withdrawal of the stanchion 12, as schematically represented by directional arrow 52, will dispose the lower portion of the stanchion 12, as well as the end or extremity 12' thereof, out of alignment with the one or more locking members 60. This allows the locking members to assume the initial, operative position as represented in FIGS. 9 and 10, due to the inherent or external biasing forces exerted on the one more locking members 60, as set forth above.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly structured to removably secure a stanchion to a support base, said assembly comprising:
 a stanchion,
 a mounting structure connected to the base in interconnecting relation between said stanchion and the base,
 a locking assembly disposed on said mounting structure and including a movable locking member automatically positionable between a released orientation and a locked orientation,
 said stanchion comprising a predetermined exterior surface portion disposable in an at least partially aligned relation relative to at least a portion of said locking member, and
 said locked and released orientations respectively are at least partially defined by said locking member disposed into and out of interruptive engagement with said at least one predetermined exterior surface portion of said stanchion on an interior of said mounting structure.

2. An assembly as recited in claim 1 wherein said locking member is pivotally connected to said mounting structure.

3. An assembly as recited in claim 2 wherein said locking member comprises an end portion disposable into and out of an interlocking and engaging relation with said predetermined exterior surface portion of said stanchion on the interior of said mounting structure.

4. An assembly as recited in claim 3 wherein said locking member is automatically disposable into said released orientation upon engagement of said stanchion with said end portion concurrent to passage of said stanchion into and along a length of said mounting member.

5. An assembly as recited in claim 4 wherein said end portion comprises a head portion at least partially structured to define a cam structure slidingly and interruptively engageable with said stanchion.

6. An assembly as recited in claim 4 wherein said locking member is manually disposable into said released orientation for withdrawal of said stanchion from said mounting structure.

7. An assembly as recited in claim 1 wherein said end portion comprises a head portion of said locking member, said head portion at least partially comprising a cam structure positionable in both sliding and interruptive engagement with an exterior of said stanchion.

8. An assembly as recited in claim 7 wherein said locking member is automatically disposable into said released orientation upon engagement of said stanchion with said head portion concurrent to passage of said stanchion into and along a length of said mounting member.

9. An assembly as recited in claim 7 wherein said locked orientation further comprises said head portion disposed in interruptive engagement with said predetermined exterior surface portion of said stanchion.

10. An assembly as recited in claim 9 wherein said predetermined exterior surface portion is at least partially defined by a recessed exterior surface portion of said stanchion.

11. An assembly as recited in claim 10 wherein said recessed exterior surface portion comprises an at least partially annular configuration disposed transverse to a length of said stanchion.

12. An assembly as recited in claim 9 wherein said predetermined exterior surface portion is defined by at least one recessed surface segment.

13. An assembly as recited in claim 12 wherein said predetermined exterior surface portion of said stanchion comprises a plurality of spaced apart recessed surface segments.

14. An assembly as recited in claim 13 wherein at least one of said plurality of recessed surface segments includes an at least partially rounded configuration and a substantially concave interior portion.

15. An assembly as recited in claim 14 wherein at least one of said plurality of recessed surface segments includes an elongated configuration extending along at least a portion of the length of said stanchion.

16. An assembly as recited in claim 14 wherein said plurality of recessed surface segments are collectively disposed in a substantially annular array and in at least partially surrounding relation to said stanchion.

17. An assembly structured to removably secure an umbrella stanchion to a supporting base, said assembly comprising:
 a stanchion,
 a mounting structure connected to the base and including an open end and a hollow interior extending along at least a portion of a length thereof,
 a locking assembly at least partially fixedly connected to said mounting assembly and including a locking member movable between a locked orientation and a released orientation,
 said locking member including an end portion disposable into said hollow interior and into an interlocking and interruptive engagement with a predetermined exterior surface portion of said stanchion to define said locked orientation,
 said locking member being automatically disposed into said released orientation upon engagement of said stanchion with said end portion during passage of said stanchion inwardly and along a length of said hollow interior of said mounting structure, and
 said released orientation at least partially defined by said end portion disposed at least partially out of said hollow interior.

18. An assembly as recited in claim 17 wherein said released orientation is further at least partially defined by said end portion disposed in sliding engagement with an exterior surface of said stanchion.

19. An assembly as recited in claim 17 wherein said end portion comprises a head portion configured to at least partially define a cam structure.

20. An assembly as recited in claim 19 wherein said cam structure comprises a locking surface having an at least partially curved configuration.

21. An assembly as recited in claim 17 wherein said head portion comprises a locking surface including an at least partially curved configuration.

22. An assembly as recited in claim 17 wherein said end portion is disposed and configured to automatically dispose said locking member in said locked orientation from said released orientation when said end portion is substantially aligned with said predetermined exterior surface portion.

23. An assembly as recited in claim 22 wherein said end portion is disposable out of interruptive engagement with said predetermined exterior surface portion upon manual disposition of said locking member into said released orientation from said locked orientation.

24. An assembly as recited in claim 23 wherein said end portion comprises a head portion of said locking member, said locking member further comprising an arm member connected to said head portion and pivotally movable therewith relative to said mounting structure.

25. An assembly as recited in claim 24 wherein said manual disposition of said locking member comprises predetermined directional positioning of said arm member on an exterior of said mounting structure.

26. An assembly as recited in claim 17 wherein said locking member comprises an elongated arm disposed exteriorly of said mounting structure and connected to said end portion, said elongated arm pivotally movable with said end portion between said locked and released orientations.

27. An assembly as recited in claim 26 wherein said mounting structure comprises a window disposed in communicating relation with said hollow interior, said locking member correspondingly disposed with said window.

28. An assembly as recited in claim 27 wherein said locked orientation comprises said end portion disposed through said window into interruptive engagement with said predetermined exterior surface portion of said stanchion.

29. An assembly as recited in claim 26 wherein said end portion is disposable out of interruptive engagement with said predetermined exterior surface portion upon manual disposition of said locking member into said released orientation from said locked orientation.

30. An assembly structured to removably secure an umbrella stanchion to a supporting base, said assembly comprising:
   a stanchion,
   a mounting structure connected to the base and including an open end and a hollow interior extending along at least a portion of a length thereof,
   a locking assembly connected to said mounting assembly and including at least one locking member movable into a locked orientation and a released orientation,
   said locking member including a first portion automatically disposable into said hollow interior and into interruptive engagement with a recessed exterior surface portion of said stanchion to define said locked orientation,
   said released orientation at least partially defined by said first portion disposed substantially out of said interruptive engagement with said recessed exterior surface portion,
   said locking member comprising a second portion disposable into abutting engagement with a stop member when said locking member is in said locked orientation,
   said locking member automatically disposable into said released orientation upon engagement of said stanchion with said first portion during entry and passage of said stanchion inwardly along said hollow interior of said mounting structure, and
   said locking member automatically disposable into said locked orientation from said released orientation when at least said first portion is substantially aligned with said predetermined exterior surface portion of said stanchion.

31. An assembly structured to removably secure an umbrella stanchion to a supporting base, said assembly comprising:
   a stanchion,
   a mounting structure connected to the base and including an open end and a hollow interior extending along at least a portion of a length thereof,
   a locking assembly at least partially fixedly connected to said mounting assembly and including a locking member movable between a locked orientation and a released orientation,
   said stanchion comprising at least one recessed exterior surface portion disposable in an aligned relation relative to an end portion of said locking member,
   said end portion of said locking member disposable into said hollow interior and into an interlocking engagement with said recessed exterior surface portion of said stanchion to define said locked orientation,
   said recessed exterior surface portion and said end portion of said locking member being cooperatively structured to restrict axial and rotational displacement of said stanchion concurrent to said locking member being disposed in said locked orientation, and
   said released orientation at least partially defined by said end portion disposed at least partially out of said hollow interior.

32. An assembly as recited in claim 31 wherein said stanchion comprises a plurality of spaced apart laterally disposed recessed external surface portions.

33. An assembly as recited in claim 32 wherein said end portion is disposable into interlocking engagement with any one of said plurality of recessed external peripheral surfaces.

34. An assembly as recited in claim 33 wherein each of the plurality of recessed exterior surface portions are cooperatively structured with said end portion to restrict axial and rotational displacement of said stanchion concurrent to said locking member being disposed in said locked orientation.

* * * * *